S. Anderson,
Hammer.
Nº 4,155.   Patented Aug. 20, 1845.
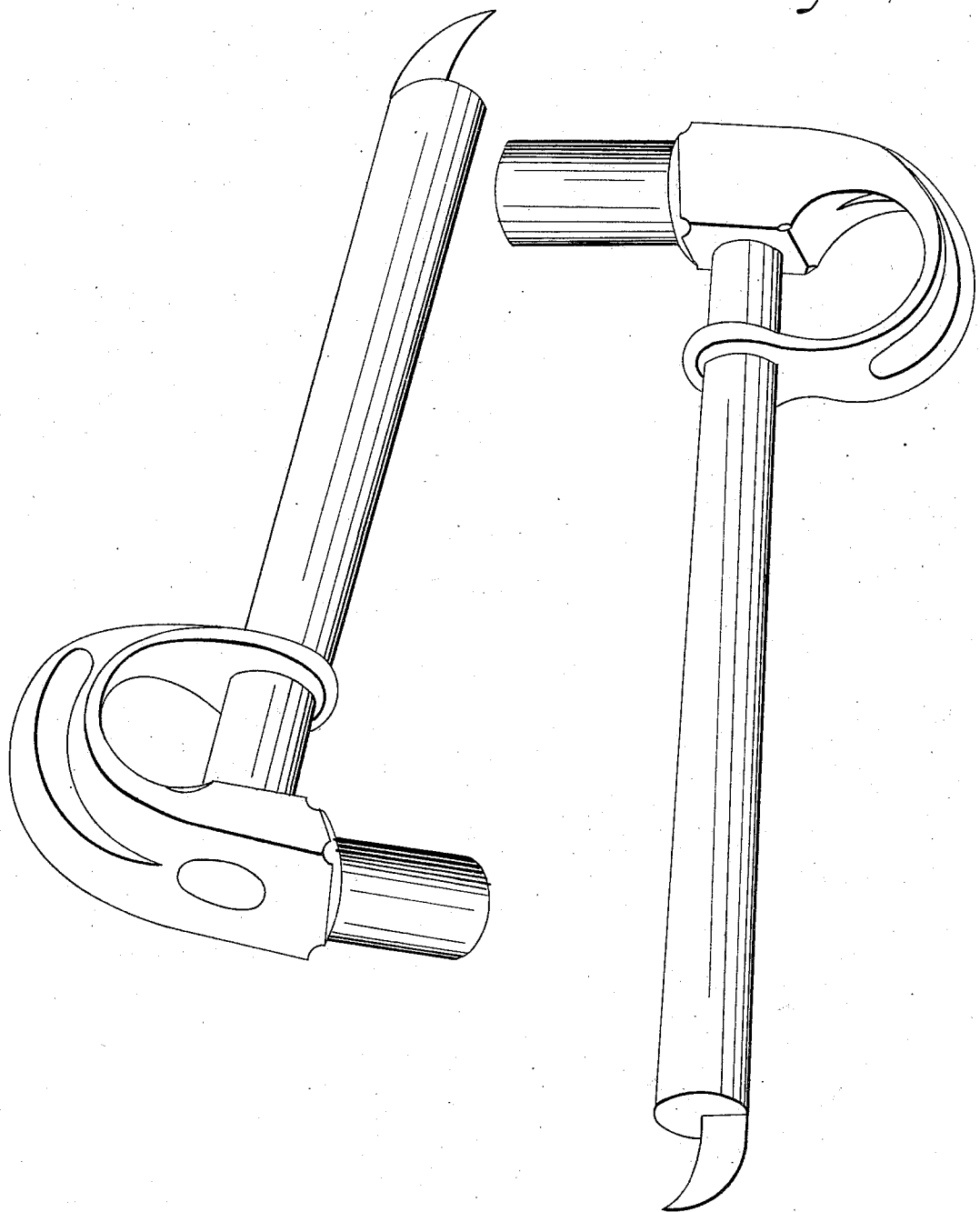

UNITED STATES PATENT OFFICE.

SOLOMON ANDERSON, OF SOUTH NEW BERLIN, NEW YORK.

HAMMER.

Specification of Letters Patent No. 4,155, dated August 20, 1845.

*To all whom it may concern:*

Be it known that I, SOLOMON ANDERSON, of South New Berlin, Chenango county, New York, have invented a new Improvement in Hammers; and I hereby declare that the following is a full and exact description.

The nature of my invention consists in extending the claw of the hammer, in a circular form, round to the hammer handle. The opening of the claw continues to within an inch of the handle, where it unites and forms a loop or second eye. In inserting the handle, it passes through this loop (made at the end of the claw as just described) and thence right on into the eye of the hammer, as will be seen by reference to the drawings, accompanying this application.

It is a great improvement in this invention, that in drawing nails or spikes, the handle is not in the least degree, loosened, but remains firm. The loop, which is about two inches up from the eye, serves to keep the handle perfectly steady and true. The handle and claw give great support to each other, in drawing or driving nails and spikes. The handle thus secured, cannot be as ordinary hammers are, broken or injured by drawing.

What I claim as my invention, and desire to secure by Letters Patent, is—

The connecting of the claw to the handle as above described, with the loop at the end for the handle to pass through.

SOLOMON ANDERSON.

Witnesses:
PHILANDER B. PRINDLE,
JAMES M. D. CASS.